(12) United States Patent
Christopher et al.

(10) Patent No.: US 12,378,093 B2
(45) Date of Patent: Aug. 5, 2025

(54) WIRE SPOOL ROTATION RESISTANCE ADJUSTERS AND WIRE FEED ASSEMBLIES HAVING ADJUSTABLE WIRE SPOOL ROTATION RESISTANCE

(71) Applicant: Illinois Tool Works Inc., Glenview, IL (US)

(72) Inventors: Mark Richard Christopher, Neenah, WI (US); Justin Durik, Greenville, WI (US); Connor Denis Uitenbroek, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 513 days.

(21) Appl. No.: 17/855,087

(22) Filed: Jun. 30, 2022

(65) Prior Publication Data
US 2024/0002187 A1  Jan. 4, 2024

(51) Int. Cl.
*B65H 49/34* (2006.01)
*B23K 9/133* (2006.01)
*B65H 49/26* (2006.01)

(52) U.S. Cl.
CPC ............ *B65H 49/34* (2013.01); *B23K 9/133* (2013.01); *B65H 49/26* (2013.01); *B65H 2403/725* (2013.01)

(58) Field of Classification Search
CPC ........ B65H 49/34; B65H 49/36; B65H 49/26; B65H 2403/725; B65H 2701/36; B65H 59/04; B65H 59/382; B23K 9/133; B23K 9/1333

See application file for complete search history.

(56) References Cited

U.S. PATENT DOCUMENTS

| 382,464 | A | * | 5/1888 | Farr | ...................... | B65H 59/04 |
| | | | | | | 242/156 |
| 619,278 | A | * | 2/1899 | Cashin | .................. | B65H 59/04 |
| | | | | | | 242/423.2 |
| 6,057,526 | A | * | 5/2000 | Lee | ...................... | B23K 9/1333 |
| | | | | | | 219/136 |
| 7,977,604 | B2 | * | 7/2011 | Ertmer | .................. | B65H 51/32 |
| | | | | | | 219/137.63 |
| 9,821,980 | B2 | | 11/2017 | Schmitz | | |
| 10,167,168 | B1 | * | 1/2019 | Bonner | .................. | B65H 49/32 |
| 2009/0236462 | A1 | * | 9/2009 | Burns | ................ | B65H 75/2413 |
| | | | | | | 242/423.1 |

(Continued)

FOREIGN PATENT DOCUMENTS

| JP | H09232063 | 9/1997 |
| WO | 2016160110 | 10/2016 |

OTHER PUBLICATIONS

European Office Communication with extended Search Report Appln No. 23181532.5 dated Nov. 9, 2023.

*Primary Examiner* — William A. Rivera
(74) *Attorney, Agent, or Firm* — McAndrews, Held & Malloy Ltd.

(57) ABSTRACT

Example wire spool hub assemblies include: a spindle configured to hold a wire spool; a spool rotation resistor positioned on the spindle to resist rotation of the wire spool on the spindle; and a resistance adjuster configured to selectively apply two or more rotation resistances via the spool rotation resistor based on two or more discrete positions of the resistance adjuster.

14 Claims, 6 Drawing Sheets

(56) References Cited

U.S. PATENT DOCUMENTS

| | | | | |
|---|---|---|---|---|
| 2013/0292366 A1* | 11/2013 | Enyedy | ............... | B23K 9/124 |
| | | | | 219/137.2 |
| 2016/0289040 A1* | 10/2016 | Schmitz | ............... | B65H 49/36 |
| 2018/0099834 A1* | 4/2018 | Madrid | ............... | B65H 75/02 |
| 2019/0255644 A1* | 8/2019 | Griffin | ............... | B65H 51/32 |
| 2020/0030905 A1* | 1/2020 | Knoener | ............ | B23K 9/1333 |
| 2022/0388805 A1* | 12/2022 | Lalonde | ............... | B65H 20/34 |
| 2022/0402722 A1* | 12/2022 | Martin | ............... | B23K 9/1333 |
| 2024/0075547 A1* | 3/2024 | Brock | ............... | B23K 9/124 |

* cited by examiner

WIRE SPOOL ROTATION RESISTANCE ADJUSTERS AND WIRE FEED ASSEMBLIES HAVING ADJUSTABLE WIRE SPOOL ROTATION RESISTANCE

FIELD OF THE DISCLOSURE

This disclosure is generally directed to welding systems and, more particularly, to wire spool rotation resistance adjusters and wire feed assemblies having adjustable wire spool rotation resistance.

BACKGROUND

In some welding-type applications, a welding wire feeder may be used to feed welding wire from a wire spool to a welding torch for a welding operation. Typically, the wire feeder pulls welding wire from the wire spool while the wire spool rotates to continuously feed the wire to the wire feeder. The wire spool can be imparted with substantial angular momentum during feeding of the welding wire.

SUMMARY

Wire spool rotation resistance adjusters and wire feed assemblies having adjustable wire spool rotation resistance are disclosed, substantially as illustrated by and described in connection with at least one of the figures, as set forth more completely in the claims.

DRAWINGS

The foregoing and other objects, features, and advantages of the devices, systems, and methods described herein will be apparent from the following description of particular embodiments thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Conventional welding wire sources involving spools of wire include a rotationally fixed material to add rotational drag to a spool of wire as the wire spool rotates during wire feeding. The drag deters tangles as the welding wire unwinds and/or as the wire feeding stops. Insufficient drag can allow the wire to tangle upon itself. Excess drag can cause softer wires such as aluminum to stretch and deform, and/or may require excess power to drive the wire feeder motor and/or induce excess wear. In conventional welding wire sources, the operator adjusts the amount of spring compression and drag via a screw or screw-type element. Adjustment usually requires a tool and involves takes trial-and-error to get the appropriate amount of drag.

Disclosed example wire spool hub assemblies and wire feed assemblies including wire spool hub assemblies reduces the time and trial-and-error involved in setting the correct spool drag. In contrast with setting the spool drag by rotating a screw as in conventional systems, disclosed example include a pivoting cam lever with discrete positions to set discrete drag levels. Disclosed examples involving cam levers provide mechanical advantage to the operator to allow tool-less drag adjustment, and allow for providing specific spring compressive forces, resulting in specific spool drag. Furthermore, disclosed examples provide for a conspicuous resistance adjustment that visually reminds and encourages operators to make the appropriate drag adjustment for the type of wire. In some examples, the discrete positions allow for configurable friction force.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

Disclosed example wire spool hub assemblies include: a spindle configured to hold a wire spool; a spool rotation resistor positioned to resist rotation of the wire spool on the spindle; and a resistance adjuster configured to selectively apply two or more rotation resistances via the spool rotation resistor based on two or more discrete positions of the resistance adjuster.

In some example wire spool hub assemblies, the resistance adjuster includes a spring positioned between a compressive surface and a spool hub and configured to bias the spool hub toward the spool rotation resistor, in which the spool hub is configured to carry the wire spool on the spindle. In some example wire spool hub assemblies, the resistance adjuster is configured to adjust compression of the spring between a first compression force in the first discrete position and a second compression force in the second discrete position. In some example wire spool hub assemblies, the resistance adjuster further includes a cam lever coupled to the spindle to adjust the compression of the spring. In some example wire spool hub assemblies, the cam lever is configured to control the compression of the spring by adjusting a position of the compressive surface via the spindle.

In some example wire spool hub assemblies, the spool rotation resistor is configured to apply a friction to the spool hub. In some example wire spool hub assemblies, the first rotation resistance is configured for a first type of wire material, and the second rotation resistance is configured for a second type of wire material. Some example wire spool hub assemblies further include a spool support configured to attach the wire spool hub to a support surface, in which the spindle extends through the spool support, and the resistance adjuster is on an opposite side of the spool support from the wire spool, the spool rotation resistor, and a compressive surface. In some example wire spool hub assemblies, the resistance adjuster is configured to provide mechanical advantage, using the spool support, to change between the first discrete position and the second discrete position.

In some example wire spool hub assemblies, the resistance adjuster is configured to apply a first rotation resistance on the spool hub via a compressive surface and the spool rotation resistor when the resistance adjuster is in a first discrete position and to apply a second rotation resistance on the spool hub via the compressive surface and the spool rotation resistor when the resistance adjuster is in a second discrete position. In some example wire spool hub assemblies, the resistance adjuster is configured to apply a third rotation resistance on the spool hub via the compressive surface and the spool rotation resistor when the resistance adjuster is in a third discrete position.

Some example wire spool hub assemblies further include a removable cap configured to be attached to the spindle, in which the removable cap includes a compressive surface. In some example wire spool hub assemblies, a position of a compressive surface along a length of the spindle is adjustable to adjust the two or more rotation resistances at corresponding ones of the two or more discrete positions of the resistance adjuster.

Disclosed example wire feed assemblies include: a wire drive assembly; a wire spool support configured to support a wire spool; and a wire spool hub assembly on the wire spool support, including: a spindle configured to hold a wire spool; a spool rotation resistor positioned on the spindle and configured to resist rotation of the wire spool on the spindle; and a resistance adjuster configured to selectively apply two or more rotation resistances via the spool rotation resistor based on two or more discrete positions of the resistance adjuster.

In some example wire feed assemblies, the wire drive assembly is configured to pull wire from the wire spool, and the spool rotation resistor is configured to stop the rotation of the wire spool when the wire drive assembly stops feeding the wire. In some example wire feed assemblies, the resistance adjuster includes a spring positioned between a compressive surface and a spool hub and configured to bias the spool hub toward the spool rotation resistor, the spool hub configured to carry the wire spool on the spindle. In some example wire feed assemblies, the resistance adjuster is configured to adjust compression of the spring between a first compression force in the first discrete position and a second compression force in the second discrete position.

In some example wire feed assemblies, the resistance adjuster further includes a cam lever coupled to the spindle to adjust the compression of the spring. In some example wire feed assemblies, the cam lever is configured to control the compression of the spring by adjusting a position of the compressive surface via the spindle. In some example wire feed assemblies, the spool rotation resistor is configured to apply a friction to the spool hub.

Figure 1:
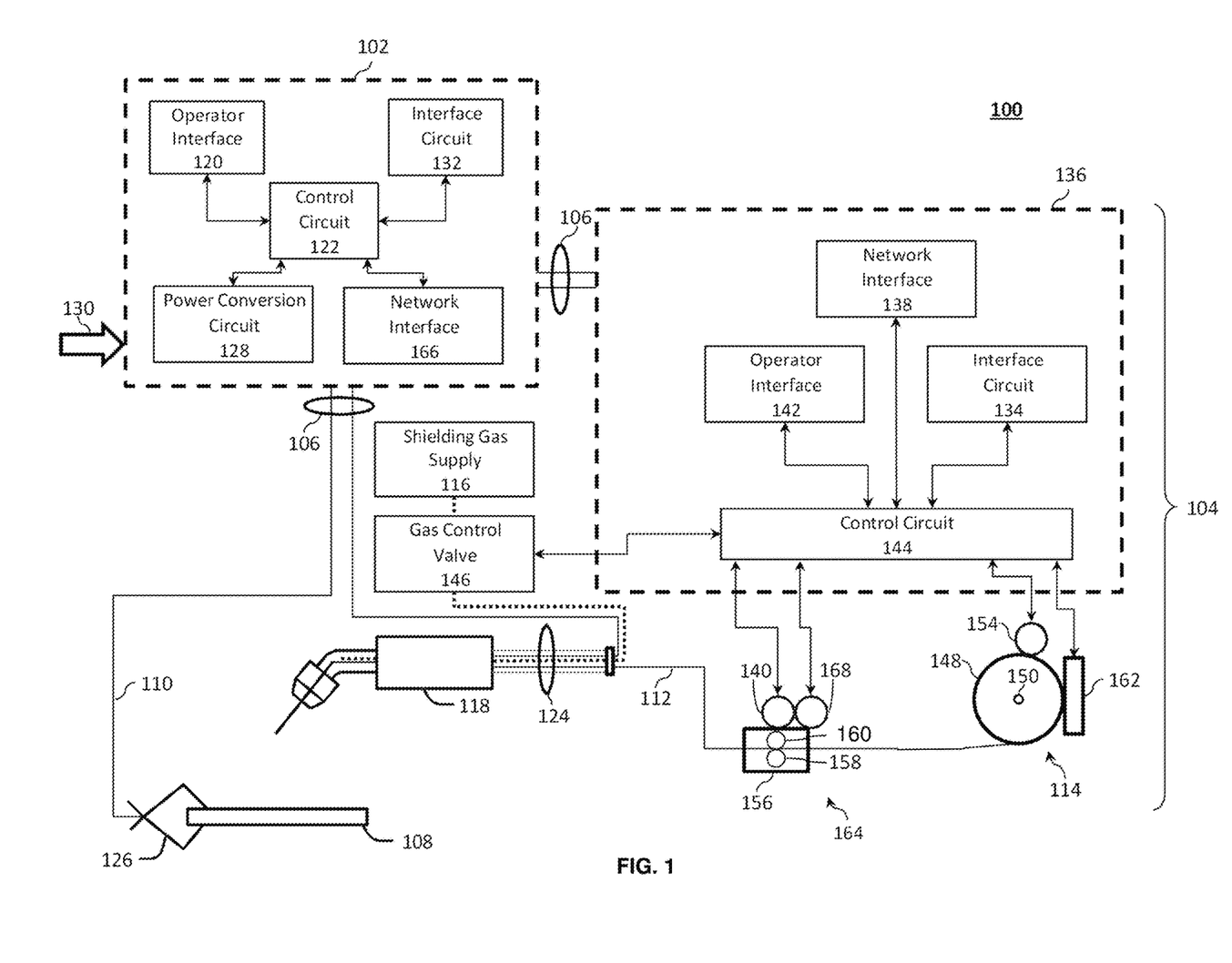
FIG. 1 illustrates an example welding system, in accordance with aspects of this disclosure.

FIG. 1 illustrates an example welding system 100 for performing welding-type operations. As shown in the welding system 100 of FIG. 1, a power supply 102 and a wire feed assembly 104 are coupled via conductors or conduits 106. In the illustrated example, the power supply 102 is separate from the wire feed assembly 104, such that the wire feed assembly 104 may be positioned near a welding location at some distance from the power supply 102. Terminals are typically provided on the power supply 102 and on the wire feed assembly 104 to allow the conductors or conduits 106 to be coupled to the systems so as to allow for power and gas to be provided to the wire feed assembly 104 from the power supply 102, and to allow data to be exchanged between the two devices.

The system 100 is configured to provide welding wire 112 from a welding wire source 114, power from the power supply 102, and shielding gas from a shielding gas supply 116, to a welding torch 118. The welding torch 118 may be any type of arc welding torch, (e.g., GMAW, GTAW, FCAW) and may allow for the feed of a welding wire 112 (e.g., an electrode wire) and gas to a location adjacent to a welding work piece 108. A work cable 110 is run to the welding work piece 108 so as to complete an electrical circuit between the power supply 102 and the welding work piece 108 via a clamp 126.

The welding system 100 is configured for weld settings (e.g., weld parameters, such as voltage, wire feed speed, current, gas flow, inductance, physical weld parameters, advanced welding programs, pulse parameters, etc.) to be selected by the operator and/or a welding sequence, such as via an operator interface 120 provided on the power supply 102. The operator interface 120 will typically be incorporated into a front faceplate of the power supply 102, and may allow for selection of settings such as the weld process, the type of wire to be used, voltage and current settings, and so forth. In particular, the example system 100 is configured to allow for welding with various steels, aluminums, or other welding wire that is channeled through the welding torch 118. Further, the system 100 is configured to employ welding wires with a variety of wire sizes. For example, between ⅟₁₆ and ⅛ inches, though other sizes are contemplated. These weld settings are communicated to a control circuit 122 within the power supply 102. The system may be particularly adapted to implement welding regimes configured for certain electrode types.

The control circuit 122, operates to control generation of welding power output that is supplied to the welding wire 112 for carrying out the desired welding operation.

The welding torch 118 applies power from the power supply 102 to the welding wire 112, typically by a welding cable 124. Similarly, shielding gas from a shielding gas supply 116 is fed through the wire feed assembly 104 and the welding cable 124. During welding operations, the welding wire 112 is advanced through a jacket of the welding cable 124 towards the welding torch 118 via the wire feed assembly 104.

The work cable 110 and clamp 126 allow for closing an electrical circuit from the power supply 102 through the welding torch 118, the welding wire 112 (electrode), and the welding work piece 108 for maintaining the welding arc during the operation.

The control circuit 122 is coupled to power conversion circuit 128. This power conversion circuit 128 is adapted to create the output power, such as pulsed waveforms applied to the welding wire 112 at the welding torch 118. Various power conversion circuits may be employed, including choppers, boost circuitry, buck circuitry, inverters, converters, and/or other switched mode power supply circuitry, and/or any other type of power conversion circuitry. The power conversion circuit 128 is coupled to a source of electrical power as indicated by arrow 130. The power applied to the power conversion circuit 128 may originate in the power grid, although other sources of power may also be used, such as power generated by an engine-driven generator, batteries, fuel cells, or other alternative sources. The power supply 102 illustrated in FIG. 1 may also include an interface circuit 132 configured to allow the control circuit 122 to exchange signals with the wire feed assembly 104. The power supply 102 may comprise a network interface 166 configured to communicate data (e.g., measurements, commands, etc.) with another device; whether a remote server, computer, or the wire feed assembly 104 (via its network interface 138).

The wire feed assembly 104 includes a complimentary interface circuit 134 that is coupled to the interface circuit 132. In some examples, multi-pin interfaces may be provided on both components and a multi-conductor cable run between the interface circuit to allow for such information as wire feed speeds, processes, selected currents, voltages or power levels, and so forth to be set on either the power supply 102, the wire feed assembly 104, or both. Additionally or alternatively, the interface circuit 134 and the interface circuit 132 may communicate wirelessly and/or via the weld cable.

The wire feed assembly 104 includes a wire feed controller 136 operatively coupled to the welding wire source 114, the first wire feeder motor 140, etc. The wire feed controller 136 may comprise a network interface 138, an operator interface 142, an interface circuit 134, and a control circuit 144. The wire feed assembly 104 also includes control circuit 144 coupled to the interface circuit 134. As described below, the control circuit 144 allows for wire feed speeds to be controlled in accordance with operator selections and/or stored sequence instructions, and permits these settings to be fed back to the power supply 102 via the interface circuit 134. The control circuit 144 is coupled to an operator interface 142 on the wire feeder that allows selection of one or more welding parameters, particularly wire feed speed. The operator interface may also allow for selection of such weld parameters as the process, the type of wire utilized, current, voltage or power settings, and so forth. The control circuit 144 may also be coupled to gas control valving 146 which regulates and measures the flow of shielding gas from the shielding gas supply 116 to the welding torch 118 via the conductors or conduits 106. In general, such gas is provided at the time of welding, and may be turned on immediately preceding the weld and for a short time following the weld operation. The shielding gas supply 116 may be provided in the form of pressurized bottles.

The wire feed assembly 104 includes components for feeding wire to the welding torch 118 and thereby to the welding operation, under the control of control circuit 144. A wire spool 148 is mounted on a spool hub 150 and configured to rotate relative to a structure (e.g., the base platform 202 described below) via the spool hub 150. The wire spool 148 is physically removable from the spool hub 150 of the wire feed assembly 104 to allow the user to replace the wire spool 148 as needed (e.g., when depleted). In some examples, the spool hub 150 is configured to support a wire spool 148 weighing between 25 and 100 pounds, or between 50 and 60 pounds. To accommodate the weight of the wire spool 148, the spool hub 150 may be fabricated from thicker gauge materials and/or comprise bearings (e.g., ball bearings) to enable the wire spool 148 to rotate more smoothly.

An inlet of the wire drive assembly 164 is connected to an outlet of the welding wire source 114 via one or more connectors. In some examples, however, the wire feeder inlet may be directly connected to the outlet of the welding wire source 114.

In operation, welding wire 112 is unspooled from the wire spool 148 and is progressively fed to the welding torch 118 by the wire drive assembly 164. The wire spool 148 may be associated with a clutch 154 that disengages the wire spool 148 when welding wire 112 is to be fed from the wire spool 148 to the welding torch 118. The clutch 154 may also be regulated, for example by the control circuit 144, to maintain a minimum friction level to avoid free spinning of the wire spool 148. The first wire feeder motor 140 of the wire drive assembly 164 may be provided within a housing 156 that engages with wire feed rollers 158 via a driving gear 160 to pull wire from the wire spool 148 and push it toward the welding torch 118. A second wire feeder motor may be provided (e.g., in push-pull arrangement) in the welding torch 118 to pull the welding wire 112 via a second drive roll assembly.

In practice, the driving gear 160 is mechanically coupled to the first wire feeder motor 140 and is rotated by the first wire feeder motor 140 to drive the wire from the wire spool 148. The driving gear 160 is mechanically coupled with one or more sets of wire feed rollers 158. As illustrated, each set of wire feed rollers 158 includes a set of two wire feed rollers 158 biased towards one another (with the welding wire 112 in between) to apply adequate pressure by the two rollers to the welding wire 112. In other aspects, where it is desirable to omit the driving gear 160, at least one of the wire feed rollers 158 is mechanically coupled to the first wire feeder motor 140. Some systems may include multiple rollers of this type. In some examples, the wire feed assembly 104 is configured to feed $\frac{1}{8}$ inch wire. In some examples, the wire feed assembly 104 is configured to feed $\frac{3}{32}$ inch wire.

A tachometer 168 or other sensor may be provided for detecting the speed of the first wire feeder motor 140, the wire feed rollers 158, or any other associated component so as to provide an indication of the actual wire feed speed. Signals from the tachometer 168 are fed back to the control circuit 144 such that the control circuit 144 can track the length of wire that has been fed. The length of wire may be used directly to calculate consumption of the wire and/or the length may be converted to wire weight based on the type of wire and its diameter.

When a wire spool 148 is installed, an operator may input information about the wire spool 148, for example via the operator interface 142. The control circuit 144 may receive this information and determine an initial amount of wire able to be fed from the wire spool 148, for example by weight or by length of wire. For example, the operator may input a spool serial number, and the control circuit 144 may determine a weight or length of wire by looking up the spool type in memory of the control circuit 144 or in an external database. In some examples, the user may input weight or wire length information and/or wire type information into the operator interface 142. The control circuit 144 can then track consumption of the wire, for example based on signals received from the tachometer 168.

The control circuit 144 may control the operator interface 142 to indicate when an amount of wire remaining in the wire spool 148 is less than a threshold amount. An operator may then be aware that the wire spool 148 should be replaced soon. In some examples, the operator interface 142 may display an amount of wire (e.g., by weight or length) remaining in the wire spool 148. In some examples, the control circuit 144 may send a command to stop or disable a welding operation when an amount of wire remaining in the wire spool 148 is less than a threshold amount.

In some examples, the welding wire source 114 includes a sensor 162 to determine an amount of wire remaining in the wire spool 148. For example, the sensor 162 may be a scale to measure the weight of the wire spool 148. Signals from the scale (sensor 162) are fed back to the control circuit 144 such that the control circuit 144 can track a consumption of welding wire by weight. As described above, the operator interface 142 may display an amount of wire remaining in the wire spool 148 (e.g., by weight or length) and/or indicate when an amount of wire remaining in the wire spool 148 is less than a threshold amount. In some examples, the control circuit 144 may send a command to stop or disable a welding operation when an amount of wire remaining in the wire spool 148 is less than a threshold amount. In some examples, rather than a scale, the sensor 162 may be a light sensor which measures approximately how much wire is left in the spool. In some examples, a light sensor may determine when an amount of wire remaining on the spool is less than a threshold amount. In some examples, multiple light sensors may be used to determine when the amount of wire remaining is at various threshold amounts.

In some examples, the wire feed assembly 104 may include a sensor 162 that detects when a welding wire source 114 is connected to the wire feed assembly 104. For example, the sensor 162 may be a radio frequency identification ("RFID") reader which reach a RFID tag on the wire spool 148. The RFID reader may receive information about the wire spool 148, for example a wire type, wire length, or wire weight. The information is sent to the control circuit 144. The control circuit 144 may track a consumption of the wire spool 148 based on the initial information received from the sensor 162 and/or monitoring use of the wire. The control circuit 144 may adjust one or more settings of the wire feed assembly 104 based on the wire type information. The control circuit 144 may also transmit the received wire type information to the power supply 102 (e.g., via the interface circuit 134). The control circuit 122 of the power supply 102 may then adjust one or more settings of the power supply 102 based on the received wire type. In some examples, the control circuit 144 of the wire feed assembly 104 or the control circuit 122 of the power supply 102 may determine whether a selected welding process or selected weld settings are compatible with the received wire type. In some examples, the operator interface (e.g., operator interfaces 120, 142) may indicate that the received wire type is not compatible with the selected welding process or selected weld settings. Other possible wireless technologies that the sensor 162 may use include Bluetooth, Bluetooth low energy, near field communication, ZigBee, RuBee, or the like.

Figure 2:
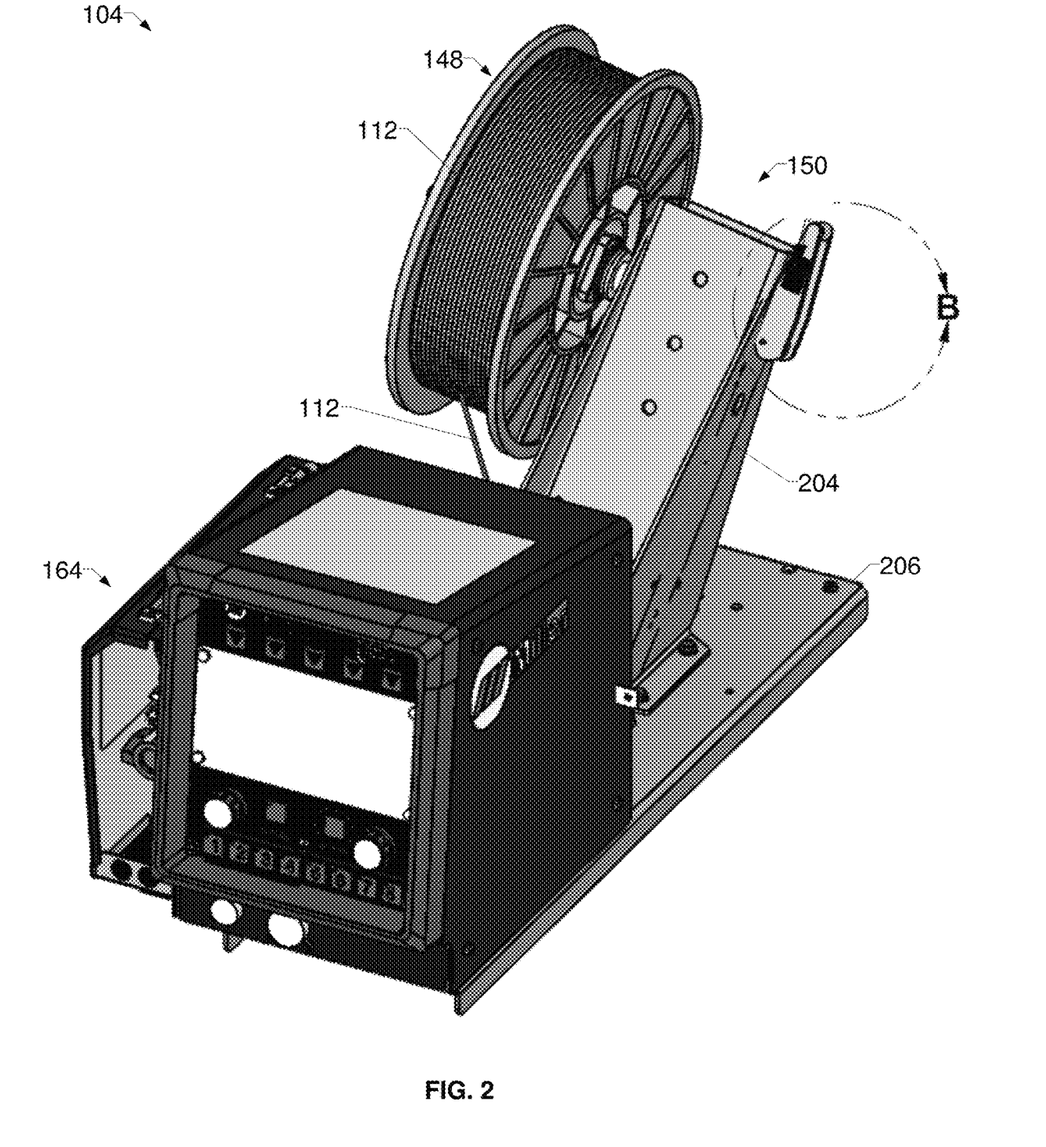
FIG. 2 is a perspective view of a wire feed assembly that may be used to implement the welding system of FIG. 1.

FIG. 2 is a perspective view of an example implementation of the wire feed assembly 104 that may be used to implement the welding system 100 of FIG. 1. The wire feed assembly 104 includes the wire spool hub 150 which holds the wire spool 148, a wire spool support 204 that holds the wire spool hub 150, a wire drive assembly (e.g., the wire drive assembly 164), and a support base 206 or surface. The wire spool 148 supplies welding wire 112 to the wire drive assembly 164, which pulls the welding wire 112 from the wire spool 148 for delivery to the welding torch 118 (FIG. 1).

The example wire spool hub 150 of FIG. 2 applies resistance or friction to the rotation of the wire spool 148 as the wire drive assembly 164 pulls the welding wire 112 from the wire spool 148. The rotation resistance deters tangles as the welding wire unwinds, and more quickly stops the rotation of the wire spool 148 when the wire drive assembly 164 stops pulling the welding wire 112.

Figure 3:
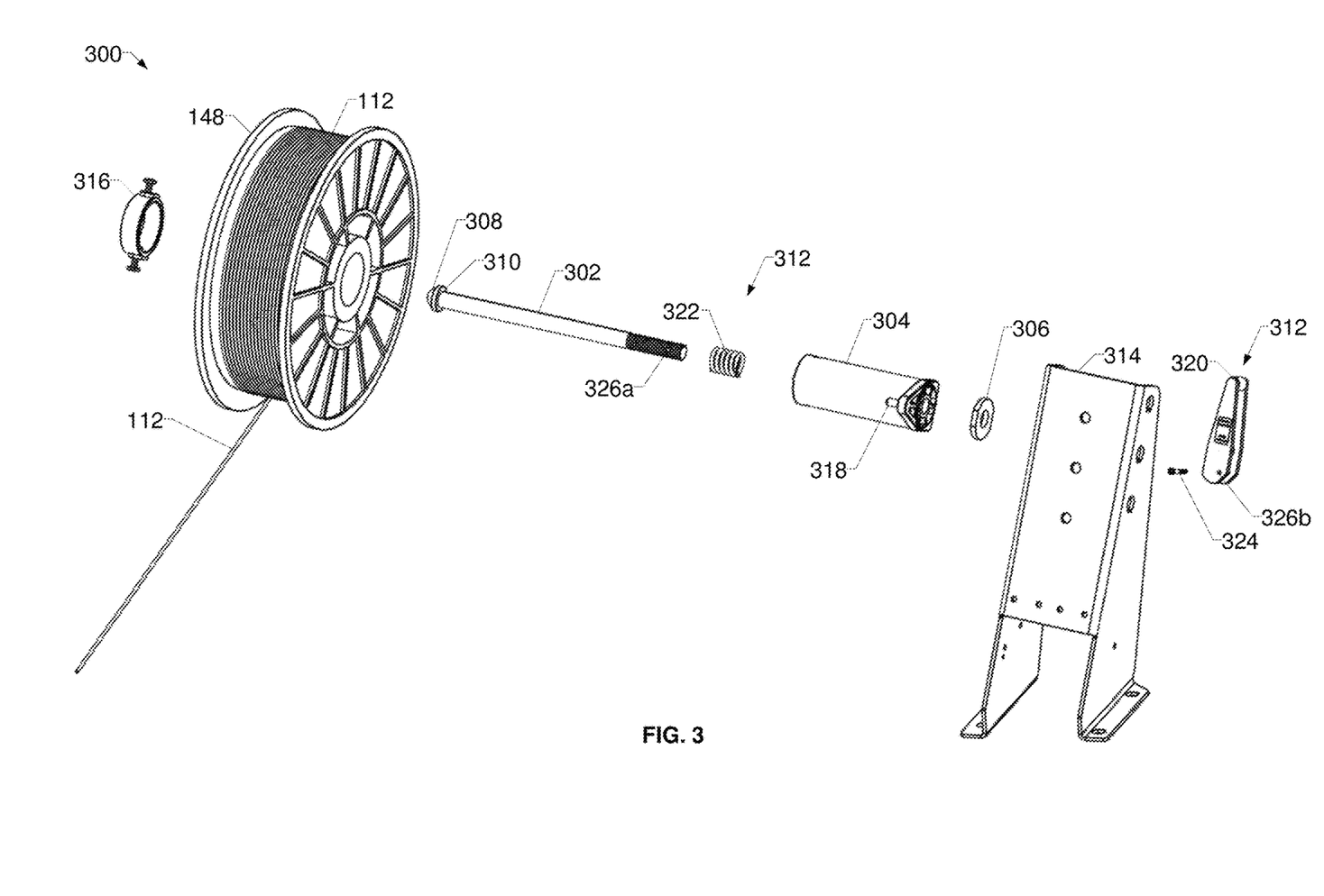
FIG. 3 is an exploded view of the example wire spool support of FIG. 2 including a wire spool rotation resistance adjuster.

The wire spool hub 150 provides for adjustment of the rotation resistance applied to the wire spool 148, to allow adjustment of the rotation resistance to suit the type of wire and/or other variables. FIG. 3 is an exploded view of an example wire spool hub assembly 300 including the spool support 204 of FIG. 2. As illustrated in FIG. 3, the example wire spool hub assembly 300 includes a spindle 302 which holds the wire spool 148 via a spool hub 304 (e.g., the wire spool hub 150), a spool rotation resistor 306 positioned on the spindle 302, a cap 308 which provides a compressive surface 310, and a resistance adjuster 312.

The example spindle 302 extends through the spool hub 304, the spool rotation resistor 306, and a spool support 314 to provide support and allow rotation of the wire spool 148. The spool support 314 may be a bracket or other structure to position the wire spool 148 in a desired position with respect to the wire feed assembly 164.

The wire spool 148 is installed onto the spool hub 304 and is secured on the spool hub 304 by a retaining ring 316. The example spool hub 304 may include a spool locking post 318 which engages the wire spool 148 to limit rotation of the wire spool 148 independent from the spool hub 304. In operation, the spool hub 304 rotates around the spindle 302 to allow rotation of the wire spool 148.

The spool hub 304 is in contact with the spool rotation resistor 306, which is positioned on the spindle 302 between the rotating spool hub 304 and the stationary spool support 314. The example spool rotation resistor 306 is a material that provides a substantially consistent friction, such as rubber or cork, over the life of the spool rotation resistor 306. As the spool hub 304 rotates, the spool rotation resistor 306 resists the rotation by applying friction forces. The spool rotation resistor 306 stops the rotation of the wire spool 148 when the wire drive assembly 164 stops pulling and feeding the wire 112 from the wire spool 148.

The amount of friction and, thus, the amount of resistance applied by the spool rotation resistor 306 to the spool hub 304 depends on the pressure applied by the spool hub 304 to the spool rotation resistor 306 or vice versa. The example resistance adjuster 312 controls the pressure applied by the spool hub 304 to the spool rotation resistor 306 to thereby control the rotation resistance. For example, a first rotation resistance may be set for a first type of wire material, a first wire spool size, and/or a first wire spool weight, a second rotation resistance is configured for a second type of wire material, a second wire spool size, and/or a second wire spool weight, etc. To this end, the example resistance adjuster 312 includes a cam lever 320 and a spring 322. In the example of FIG. 3, the spring 322 is positioned between the compressive surface 310 (e.g., a shoulder, a pin through or attached to the spindle 302, a flange, etc.) and a surface of the spool hub 304 to bias the spool hub 304 toward the rotation resistor 306. The surface of the spool hub 304 may be an exterior or interior surface of the spool hub 304.

Figure 4:
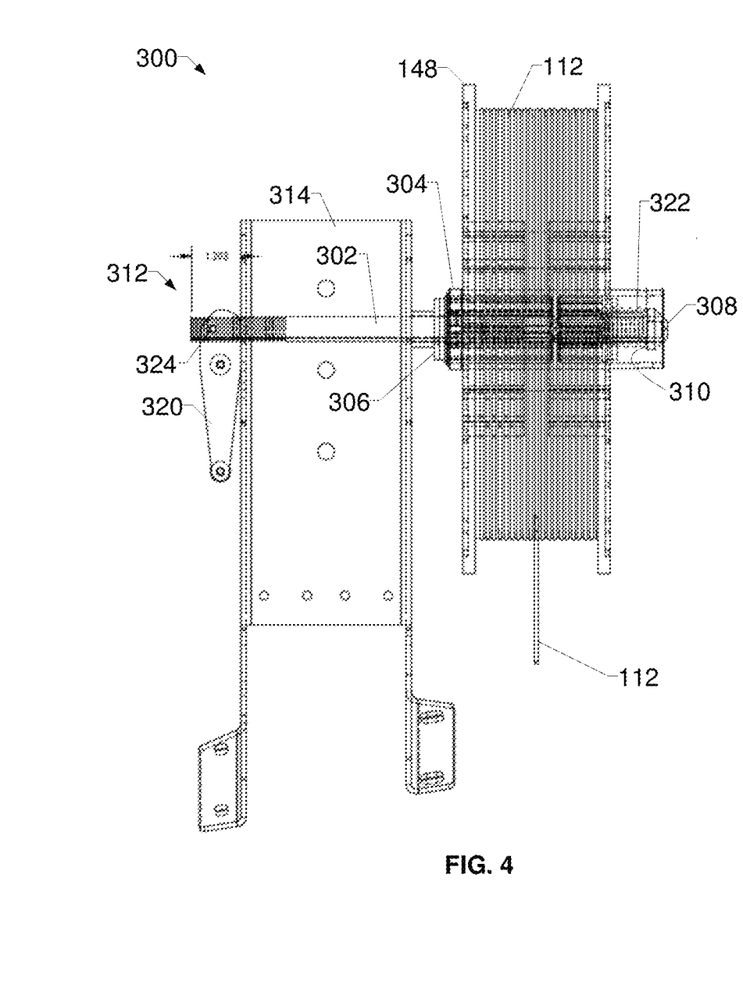
FIG. 4 is a transparent schematic view of the example wire spool support of FIG. 2 configured to have a first discrete rotation resistance.
Figure 5:
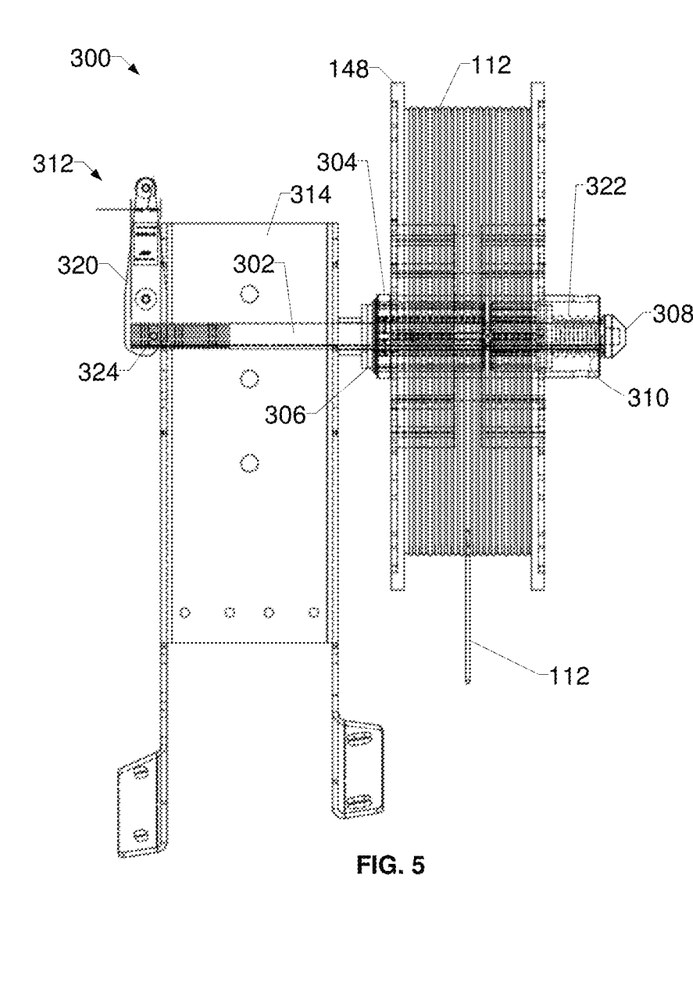
FIG. 5 is a transparent schematic view of the example wire spool support of FIG. 2 configured to have a second discrete rotation resistance.

The cam lever 320 is attached to the spindle 302 opposite the cap 308 and compressive surface 310, and can be moved to two or more discrete positions. In the example of FIG. 3, the cam lever 320 is pinned to an end of the spindle 302 via a bolt 324 and corresponding bores 326a, 326b in the spindle 302 and the cam lever 320. However, the cam lever 320 may be attached in other ways, such as via a cotter pin, clevis pin, shackle, clamp, threads, and/or any other attachment technique. FIG. 4 is a transparent schematic view of the example wire spool hub assembly 300 of FIG. 3 configured to have a first discrete rotation resistance. FIG. 5 is a transparent schematic view of the example wire spool hub assembly 300 of FIG. 3 configured to have a second discrete rotation resistance.

Each of the discrete positions exerts a different pulling force on the spindle 302 and compressive surface 310, which changes the position of the compressive surface 310 and applies a different compression force on the spring 322 between the compressive surface 310 and the spool hub 304. For example, in the configuration illustrated in FIG. 4, the cam lever 320 is in a first position, which pulls the end of the spindle 302 a farther distance 402 from the spool support 314 and causes a larger compression of the spring 322 by the compressive surface 310, thereby increasing the compression between the spool hub 304 and the rotation resistor 306. Conversely, in the configuration illustrated in FIG. 5, the cam lever 320 is in a second position, which pulls the end of the spindle 302 a shorter distance 502 from the spool support 314 and reduces a compression of the spring 322 by the compressive surface 310, thereby reducing the compression between the spool hub 304 and the rotation resistor 306. As a result, each discrete position of the cam lever 320 results in a different pressure applied by the hub 304 to the rotation resistor 306 and, as a result, a different rotation resistance on the wire spool 148. The cam lever 320 applies leverage to the spindle 302 via the stationary spool support 314.

The example cam lever 320 of FIG. 3 provides mechanical advantage to the operator for adjusting the rotation resistance between discrete positions. The mechanical advantage provided may be adjusted by changing the dimensions of the cam lever 320 and/or by using different adjustment devices (e.g., a dial having slots or detents to set the discrete positions, etc.). The cam lever 320 allows the operator to selectively apply two or more rotation resistances based on two or more discrete positions of the cam lever 320 (e.g., moving the cam lever 320 fully in a first direction, moving the cam lever 320 fully in a second, opposite direction).

The example cap 308 may be removable (e.g., threaded) or may be permanently affixed to the spindle 302 (e.g., a bolt head, a weldment, a crimped or compressed cap, etc.). In some examples, the position of the cap 308 is adjustable along the length of the spindle 302 to further control the compression of the spring 322 and, as a result, control the rotation resistances applied in each of the discrete positions of the resistance adjuster 312.

Figure 6:
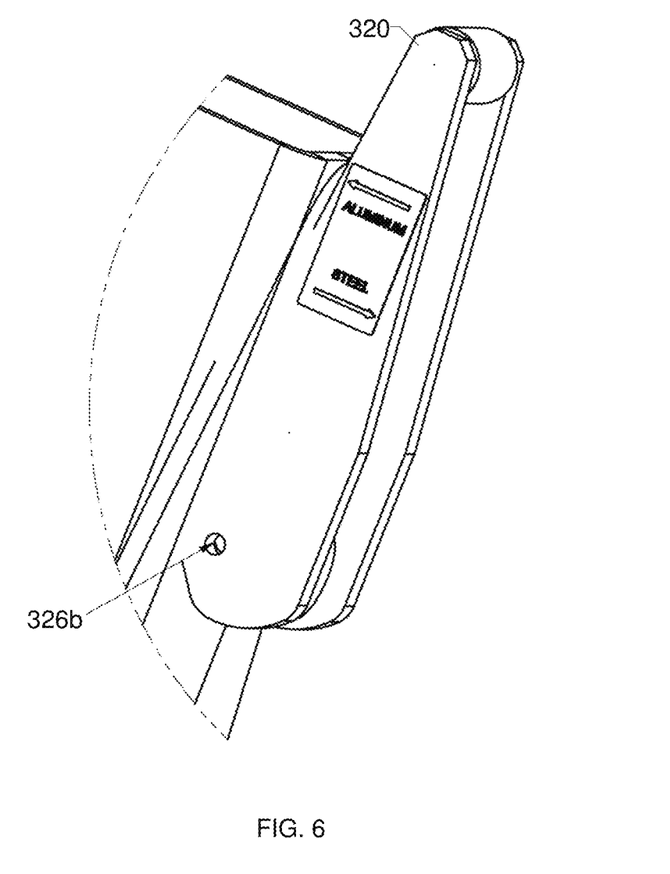
FIG. 6 is a perspective view of an example implementation of the cam lever of FIGS. 3-5.

FIG. 6 is a perspective view of an example implementation of the cam lever 320 of FIGS. 3-5. As illustrated in FIG. 6, the cam lever 320 may be marked to indicate the rotation resistance corresponding to different wire materials (e.g., steel, aluminum, etc.), and/or different sizes and/or weights of wire spools.

While an example arrangement of the spool hub 304, the rotation resistor 306, the cap 308 and compressive surface 310, and the resistance adjuster 312 are illustrated in FIGS. 3, 4, and 5, other arrangements may be used. For example, FIG. 7 is a schematic view of another example spool hub assembly 700 including another example wire spool rotation resistance adjuster that may be used to implement the welding system 100 of FIG. 1.

Figure 7:
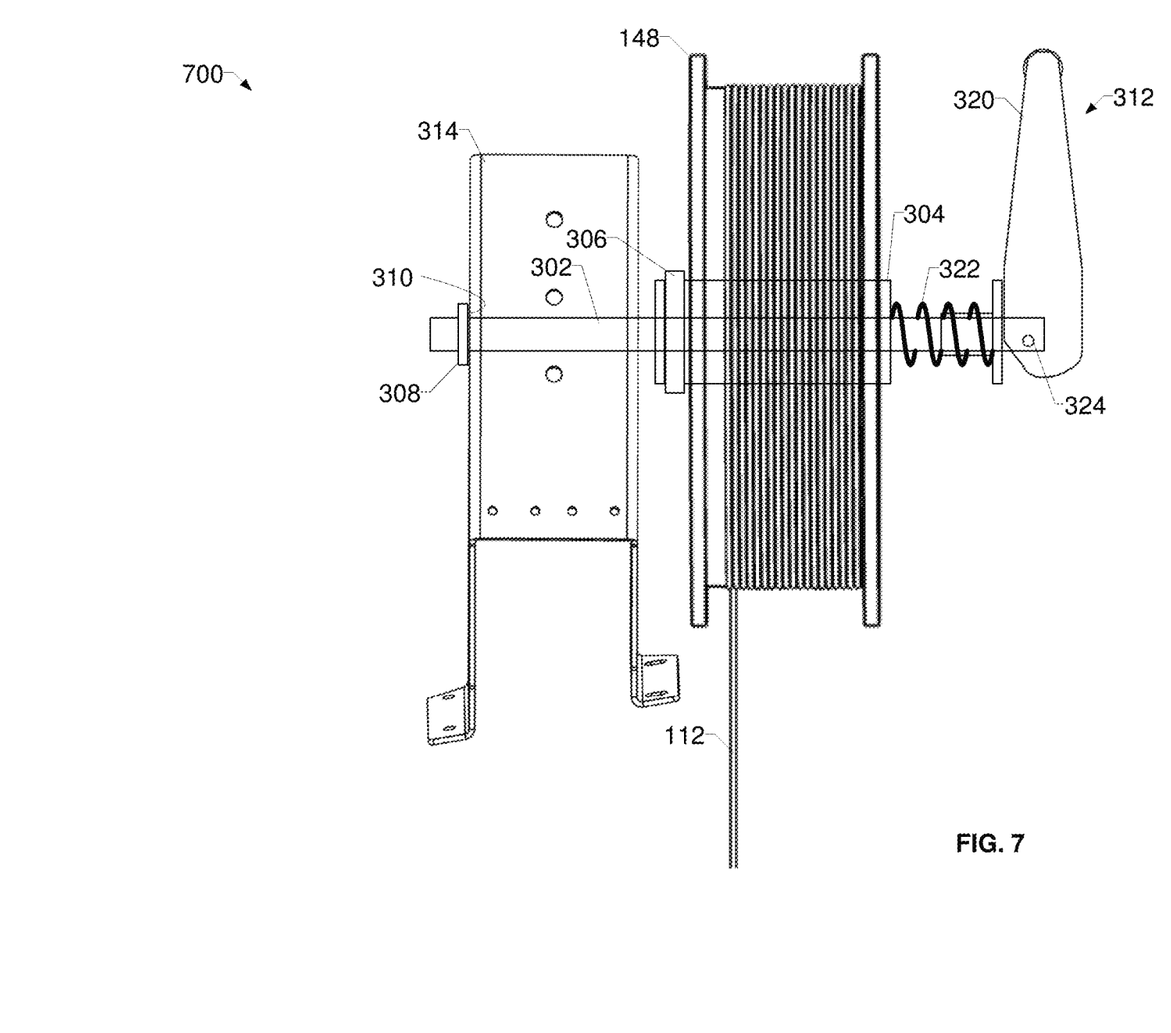
FIG. 7 is a schematic view of another example wire spool support including another example wire spool rotation resistance adjuster that may be used to implement the welding system of FIG. 1.

In the example of FIG. 7, the cam lever 320 may reverse positions with the cap 308 and compressive surface 310, such that the compressive surface 310 is positioned on an opposite side of the spool support 314 from the wire spool 148, and the cam lever 320 is positioned adjacent the wire spool 148 opposite the spool support 314. In such an example, the cam lever 320 and spring 322 may be further configured such that the cam lever 320 applies force to the spring 322 (e.g., via a washer, bushing, flange, or other surface) to bias the spool hub 304 toward the rotation resistor 306.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

The term "welding-type system," as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

The term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

The terms "circuit" and "circuitry" includes any analog and/or digital components, power and/or control elements, such as a microprocessor, digital signal processor (DSP), software, and the like, discrete and/or integrated components, or portions and/or combinations thereof.

The terms "control circuit" and "control circuitry," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards, that form part or all of a controller, and are used to control a welding process, a device such as a power source or wire feeder, motion, automation, monitoring, air filtration, displays, and/or any other type of welding-related system.

The term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), flash memory, solid state storage, a computer-readable medium, or the like.

While the present methods and systems has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A wire spool hub assembly, comprising:
a spindle configured to hold a wire spool;
a spool rotation resistor positioned to resist rotation of the wire spool on the spindle; and
a resistance adjuster, comprising:
a spring positioned between a compressive surface and a spool hub and configured to bias the spool hub toward the spool rotation resistor, the spool hub configured to carry the wire spool on the spindle; and
a cam lever coupled to the spindle to adjust the compression of the spring, wherein the resistance adjuster is configured to selectively apply two or more rotation resistances via the spool rotation resistor based on two or more discrete positions of the resistance adjuster by adjusting, via the cam lever, the compression of the spring between a first compression force in the first discrete position and a second compression force in the second discrete position.

2. The wire spool hub assembly as defined in claim 1, wherein the cam lever is configured to control the compression of the spring by adjusting a position of the compressive surface via the spindle.

3. The wire spool hub assembly as defined in claim 1, wherein the spool rotation resistor is configured to apply a friction to the spool hub.

4. The wire spool hub assembly as defined in claim 1, wherein the first rotation resistance is configured for a first type of wire material, and the second rotation resistance is configured for a second type of wire material.

5. The wire spool hub assembly as defined in claim 1, further comprising a spool support configured to attach the wire spool hub to a support surface, wherein:
the spindle extends through the spool support, and
the resistance adjuster is on an opposite side of the spool support from the wire spool, the spool rotation resistor, and a compressive surface.

6. The wire spool hub assembly as defined in claim 5, wherein the resistance adjuster is configured to provide mechanical advantage, using the spool support, to change between the first discrete position and the second discrete position.

7. The wire spool hub assembly as defined in claim 1, wherein the resistance adjuster is configured to apply a first rotation resistance on the spool hub via a compressive surface and the spool rotation resistor when the resistance adjuster is in a first discrete position and to apply a second rotation resistance on the spool hub via the compressive surface and the spool rotation resistor when the resistance adjuster is in a second discrete position.

8. The wire spool hub assembly as defined in claim 7, wherein the resistance adjuster is configured to apply a third rotation resistance on the spool hub via the compressive surface and the spool rotation resistor when the resistance adjuster is in a third discrete position.

9. The wire spool hub assembly as defined in claim 1, further comprising a removable cap configured to be attached to the spindle, the removable cap comprising a compressive surface.

10. The wire spool hub assembly as defined in claim 1, wherein a position of a compressive surface along a length of the spindle is adjustable to adjust the two or more rotation resistances at corresponding ones of the two or more discrete positions of the resistance adjuster.

11. A wire feed assembly, comprising:
a wire drive assembly;
a wire spool support configured to support a wire spool; and
a wire spool hub assembly on the wire spool support, comprising:
a spindle configured to hold a wire spool;
a spool rotation resistor positioned on the spindle and configured to resist rotation of the wire spool on the spindle; and
a resistance adjuster configured to selectively apply two or more rotation resistances via the spool rotation resistor based on two or more discrete positions of the resistance adjuster, wherein the resistance adjuster comprises a spring positioned between a compressive surface and a spool hub and configured to bias the spool hub toward the spool rotation resistor, the spool hub configured to carry the wire spool on the spindle, the resistance adjuster further comprises a cam lever coupled to the spindle to adjust the compression of the spring between a first compression force in the first discrete position and a second compression force in the second discrete position.

12. The wire feed assembly as defined in claim 11, wherein the wire drive assembly is configured to pull wire from the wire spool, and the spool rotation resistor is configured to stop the rotation of the wire spool when the wire drive assembly stops feeding the wire.

13. The wire feed assembly as defined in claim 11, wherein the cam lever is configured to control the compression of the spring by adjusting a position of the compressive surface via the spindle.

14. The wire feed assembly as defined in claim 11, wherein the spool rotation resistor is configured to apply a friction to the spool hub.

\* \* \* \* \*